United States Patent [19]

Ghate et al.

[11] Patent Number: 4,696,680
[45] Date of Patent: Sep. 29, 1987

[54] METHOD AND APPARATUS FOR THE SELECTIVE SEPARATION OF GASEOUS COAL GASIFICATION PRODUCTS BY PRESSURE SWING ADSORPTION

[75] Inventors: Madhav R. Ghate, Morgantown, W. Va.; Ralph T. Yang, Williamsville, N.Y.

[73] Assignee: The United States of America as represented by the United States Department of Energy, Washington, D.C.

[21] Appl. No.: 783,606

[22] Filed: Oct. 3, 1985

[51] Int. Cl.[4] ............................................. B01D 53/04
[52] U.S. Cl. ............................................. 55/25; 55/58; 55/68; 55/73; 55/74; 55/75
[58] Field of Search ................... 55/25, 26, 58, 62, 68, 55/73, 74, 75, 179, 180, 387, 389

[56] References Cited

U.S. PATENT DOCUMENTS

| Re. 31,014 | 8/1982 | Sircar | 55/26 |
|---|---|---|---|
| 3,086,339 | 4/1963 | Skarstrom et al. | 55/26 |
| 3,365,859 | 1/1968 | Sandberg | 55/25 |
| 3,619,984 | 11/1971 | Domine et al. | 55/25 |
| 3,638,398 | 2/1972 | Domine et al. | 55/25 |
| 3,751,878 | 8/1973 | Collins | 55/58 |
| 3,944,400 | 3/1976 | Bird | 55/58 X |
| 4,077,779 | 3/1978 | Sircar et al. | 55/25 |
| 4,093,429 | 6/1978 | Siegler et al. | 55/58 |
| 4,171,207 | 10/1979 | Sircar | 55/26 |
| 4,359,328 | 11/1982 | Wilson | 55/26 |
| 4,432,774 | 2/1984 | Jüntgen et al. | 55/25 |
| 4,521,221 | 6/1985 | Richter et al. | 55/25 X |
| 4,529,415 | 7/1985 | Szirmay | 55/62 |
| 4,539,020 | 9/1985 | Sakaraya et al. | 55/26 |

FOREIGN PATENT DOCUMENTS 2155805 10/1985 United Kingdom .................. 55/25

OTHER PUBLICATIONS

"Gas-Adsorption Processes: State of the Art", *Industrial Gas Separations*, G. E. Keller, II, Am. Chem. Soc., Washington, D.C. (1983), pp. 145–169.

Primary Examiner—Robert Spitzer
Attorney, Agent, or Firm—Earl L. Larcher; Stephen D. Hamel; Judson R. Hightower

[57] ABSTRACT

Bulk separation of the gaseous components of multicomponent gases provided by the gasification of coal including hydrogen, carbon monoxide, methane, and acid gases (carbon dioxide plus hydrogen sulfide) are selectively adsorbed by a pressure swing adsorption technique using activated carbon, zeolite or a combination thereof as the adsorbent. By charging a column containing the adsorbent with a gas mixture and pressurizing the column to a pressure sufficient to cause the adsorption of the gases and then reducing the partial pressure of the contents of the column, the gases are selectively and sequentially desorbed. Hydrogen, the least absorbable gas of the gaseous mixture, is the first gas to be desorbed and is removed from the column in a co-current direction followed by the carbon monoxide, hydrogen and methane. With the pressure in the column reduced to about atmospheric pressure the column is evacuated in a countercurrent direction to remove the acid gases from the column. The present invention is particularly advantageous as a producer of high parity hydrogen from gaseous products of coal gasification and as an acid gas scrubber.

13 Claims, 3 Drawing Figures

METHOD AND APPARATUS FOR THE SELECTIVE SEPARATION OF GASEOUS COAL GASIFICATION PRODUCTS BY PRESSURE SWING ADSORPTION

BACKGROUND OF THE INVENTION

The present invention relates generally to the bulk separation of gaseous components generated during coal gasification, and more particularly to the efficient and cost-effective separation of discrete components of such coal gasification products especially hydrogen at high purity levels and acid gases by pressure swing adsorption.

Coal gasification is receiving increased interest as a suitable mechanism for the production of high purity hydrogen and other valuable fuel gases including carbon monoxide and methane. In coal gasification processes steam and oxygen are utilized in the gasifier for the production of hydrogen-rich product gases. A water-gas shift reaction is then used to provide high purity hydrogen from the product gases. The hydrogen so produced is usually separated from the fuel gases CO and $CH_4$ and the acid gases ($CO_2+H_2S$) by distillation or other vapor-liquid separation techniques. The removal of the acid gases and other gaseous sulfur-bearing components present in the coal gasification products is normally achieved by low-temperature, physical and chemical adsorption apparatus. These processes are cryogenic and are high energy users which render the process relatively expensive for hydrogen production.

Pressure swing adsorption is a relatively recent development for gas separation. Generally, pressure swing adsorption provides for the selective concentration or adsorption of one or more of the gaseous components (adsorbates) of a gaseous mixture on the surface of porous solid adsorbents such as zeolites, alumina, activated carbon, and molecular seive carbon. The adsorption of the gas components is in accordance with their molecular makeup and as defined by Van der Waals equation, certain gas components are more readily adsorbed on adsorbents at particular pressures. For example, $CH_4$ is adsorbed by activated carbon at a lower pressure than hydrogen and has a greater retentivity than hydrogen so as to remain on the adsorbent when the partial pressure of the adsorbent bed is reduced. This desorption provides for the separation of the gas components. Details of pressure swing adsorption and other gas adsorption processes are discussed in the publication: "Gas-Adsorption Processes: State of the Art", in "Industrial Gas Separations" by George E. Keller, II, American Chemical Society, Washington, DC (1983) pp. 145–169.

Pressure swing adsorption processes have been used where trace amounts of impurities are removed from a product gas, or for air drying. In pressure swing adsorption processes the partial pressures of the adsorbates on the adsorbent are utilized for the selective separation of a desired gaseous component from a gaseous mixture. Often a portion of the less adsorbed product is utilized to purge the adsorbent of the gases remaining in the adsorbent-containing column. Thus, an inevitable feature of the known pressure swing adsorption processes is that a portion of the less adsorbed product is lost to the purge stream during the process. This particular problem provides a strong implication that the purge stream can not be of high purity so as to limit known pressure swing adsorption processes to operations where only one product of high purity is desired.

The pressure swing adsorption process as previously known have not been suitable for bulk separation of the multi-component gases produced by the gasification of coal in concentrated or high purity form. All of the gaseous components produced by coal gasification are considered to be valuable products by themselves especially if recoverable at high purity levels.

SUMMARY OF THE INVENTION

It is a primary aim or objective of the present invention to provide for the bulk separation of the multi-component coal gasification products into individual gases of high purity.

Another object of the present invention is to provide a combined gas separation process for yielding hydrogen at a purity level greater than 99.7% with less than 0.001% sulfur components and providing an acid gas scrubber. Also, other components of the gaseous products of coal gasification such as carbon monoxide and methane can be selectively separated at high levels of purity by practicing the present invention.

Generally, the present invention is practiced with a coal gasification system operating at either atmospheric or elevated pressures in the range of about 1 to 1,000 psig. Preferably, the coal gasifier is of the pressurized type since the energy requirements with such a system would be considerably less for pressure swing adsorption separation of the gaseous components due to the available pressures of the gases exiting the gasifier. The multi-component gases generated during the coal gasification process wherein coal is gasified at atmospheric or elevated pressures include hydrogen, carbon monoxide, methane and acid gases (carbon dioxide and hydrogen sulfide). The bulk separation of these gases by pressure swing adsorption comprise the steps of conveying a stream of the mixture of gases from the coal gasification process into a column containing a solid particulate adsorbent for each of the gases forming the mixture of gases. The charge of gases within the column is pressurized to a pressure within a range sufficient to effect the adsorption by the adsorbent of the conveyed gases including hydrogen which defines at least adsorbable in the mixture. The gaseous components of the mixture are then selectively removed by sufficiently decreasing the partial pressure of the contents in said column by co-current blowdown to effect the sequential desorption of the gases, $H_2$, CO, and $CH_4$, from said mixture of gases held on the adsorbent. Each of the separated gases are conveyed from the column upon desorption from said adsorbent. After removing the $H_2$, CO and $CH_4$ the acid 9ases components are desorbed and conveyed from the column by evacuating the column to an adequate subatmospheric pressure.

In some instances, such as with gasifiers operating at atmospheric pressure, the charge of gases being conveyed to the column are already at or reduced to approximately atmospheric pressure which is sufficient to effect the adsorption of the acid gases. In this case at least one additional column containing an adsorbent for the gaseous products is placed between the gasifier and the above-mentioned column for effecting the adsorption of the acid gases. With these acid gases adsorbed the $H_2$, CO and $CH_4$ gases are conveyed from the additional column into the first-mentioned column containing an adsorbent for the $H_2$, CO and $CH_4$. The gases in this first-mentioned column are then, as described above, sufficiently pressurized to effect the adsorption of the gases. This pressurized column is then subjected to co-current blowdown for decreasing the partial pressure in the column to sequentially desorb the $H_2$, the CO and the $CH_4$. These gases are sequentially removed or cut from the stream of desorbed gases emanating from the column to provide individual or discrete streams of high purity gases.

In the pressure swing adsorption process for the bulk separation of multi-component gasification products in accordance with the present invention it is very important to have the adsorbent bed no more than about half covered with the adsorbates in the high pressure adsorption step as compared to presently known pressure swing adsorption processes in which the adsorbent bed is nearly fully covered by the adsorbates. By utilizing a column in which the bed is no more than half covered by the adsorbates the adsorption and desorption of the gases by the adsorbent provides for concentrated products for the strongly adsorbed components. Another significant advantage of the present invention over the prior art pressure swing adsorption processes is that in the prior art a single countercurrent blowdown or decrease in partial pressure step was utilized effecting the desorption and removal of the desorbed gas components from the adsorbent column. In the present invention, on the other hand, the partial pressure in the adsorbent bed is reduced by co-current blowdown followed by the evacuation of the bed in a countercurrent direction for the removal of the acid gases. This particular arrangement of flows provided by the present invention is highly advantageous since the less readily adsorbed gases flow through the column a greater distance before being adsorbed during pressurization of the adsorbent bed than the more readily adsorbed gases which are adsorbed in the upper or initial portion of the bed contacted by the gases. Thus, upon the reduction of the partial pressure in the bed by co-current blowdown the first gas emanating from the bottom of the column would be the high purity, least adsorbed gas which is primarily contained on the adsorbent near the bottom of the column. This co-current blowdown procedure allows for the removal of higher purity gases than by practicing previously known countercurrent flow procedures for the removal of desorbed gases. Inasmuch as the acid gases ($CO + H_2S$) are two of the more readily adsorbed gases in the gasification products they would be contained on the adsorbent near the feed inlet rather than down further in the column so that countercurrent flow during evacuation of the column readily removes or flushes these acid gases from the adsorbent bed so as to effectively scrub the gaseous products of the acid gases.

Other and further objects of the invention will be obvious upon an understanding of the illustrative embodiments and methods about to be described or will be indicated in the appended claims, and various advantages not referred to herein will occur to one skilled in the art upon employment of the invention in practice.

Preferred embodiments of the invention have been chosen for the purpose of illustration and description. These preferred embodiments illustrated are not intended to be exhaustive or to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

DESCRIPTION OF THE INVENTION

As briefly described above, the present invention is directed to the bulk separation of gaseous components derived from the gasification of coal by pressure swing adsorption. The pressure swing adsorption system is used in conjunction with coal gasifiers of the ambient pressure and the pressurized types operating as a fixed bed, moving bed or a fluidized bed. By utilizing pressure swing adsorption apparatus in conjunction with a coal gasifier the product gases discharging from the gasifier can be readily separated into discrete component gases of relatively high purity especially hydrogen. A particular advantage of the present invention is that sour or acid gases, namely, CO and $H_2S$, can be readily scrubbed from the gasification products by pressure swing adsorption. The removed acid gases provide a source of sulfur which can be readily converted into elemental sulfur in a relatively economical manner. The gases produced in and discharged from the coal gasifiers are predominantly formed of $H_2$, CO, $CH_4$, $CO_2$, $H_2S$ and minor quantities (less than 5%) of several other gases including sulfur components.

Figure 1:
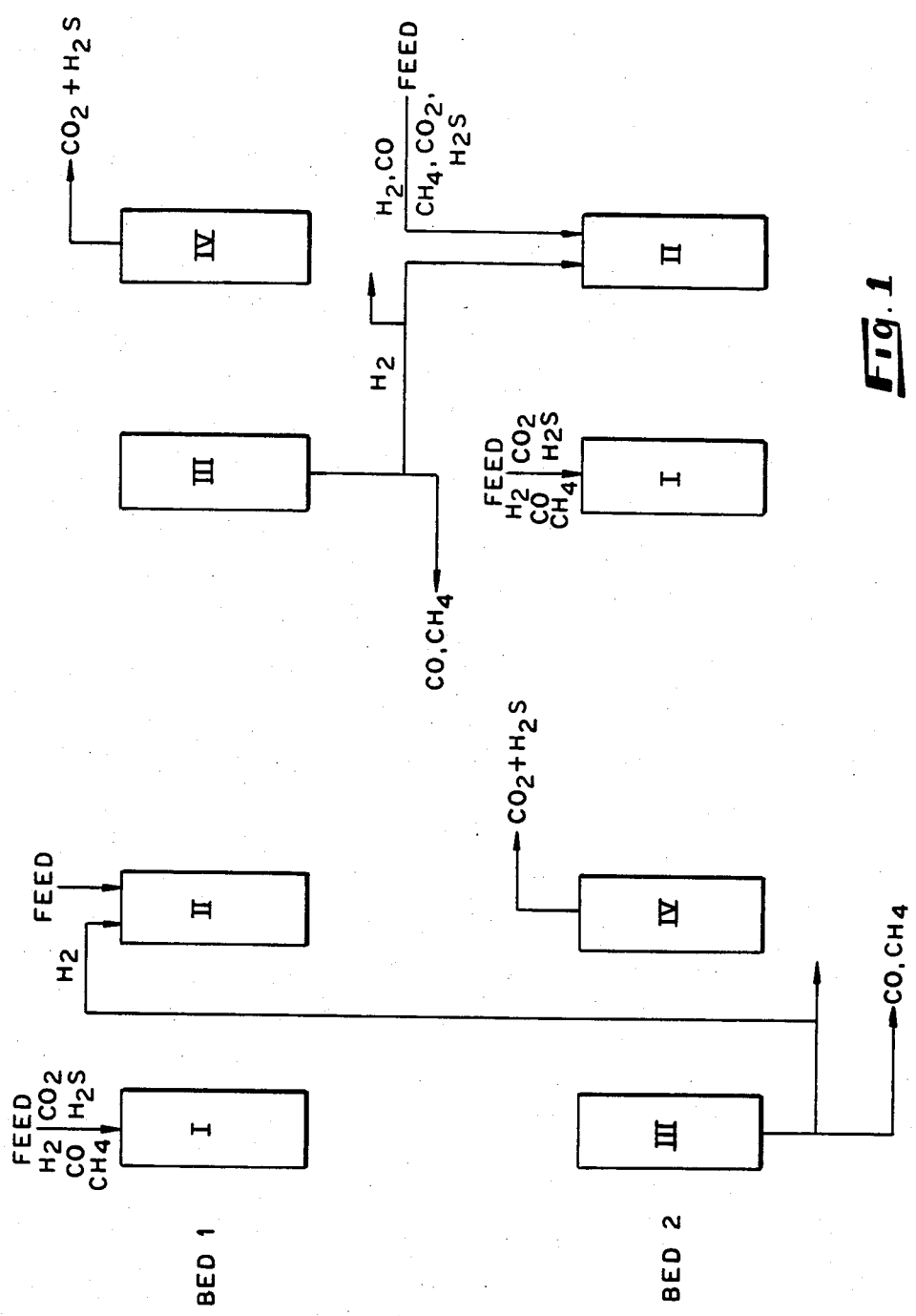
FIG. 1 is a view showing a typical flow diagram for a two-bed pressure swing adsorption arrangement utilized for the bulk separation of gaseous components derived from a coal gasification process.

The bulk separation of the present invention is generally shown in FIG. 1, as a two-column bed with each bed or column being subjected to a four step cycle for the adsorption and desorption of the gaseous components in a stream of coal gasification products. The gaseous products are introduced as feed stream into the columns which contain a porous solid adsorbent such as particulate activated carbon, zeolites or a combination thereof. With reference to FIG. 1, column or bed 1 is shown at step I being charged with a feed stream of gases from the coal gasifier (not shown) while bed 2 is at the step III is at some stage of co-current blowdown desorption as will be described below. Bed 1 in step I is pressurized to a pressure of at least about 50 psig which is adequate to effect the adsorption of all of the gases in the feed on the adsorbent including $H_2$ which is the least adsorbable gas in the feed. This pressurization of bed 1 as shown in step II may be achieved by withdrawing $H_2$ hydrogen from another bed such as from step III of bed 2 and by a feed stream compressor (not shown) if necessary such as in the case of gasifier operating at a pressure lower than that required for the adsorption of the gases. Normally a pressure in the range of about 50–500 psig (4.4 to 35 atmospheres) is utilized for pressurizing the beds to effect the adsorption of all the gases with the higher pressures in this range being provided by pressurized gasifiers. In a typical pressurization of an adsorbent-containing bed with the feed and/or $H_2$, with or without additional pressurization, as in step II, the bed is pressurized from a low pressure of about 0.001 to 0.5 atmospheres to a high pressure of about 100–500 psig. This pressurization of the bed can take place in about 0.5 minutes. The pressurization of the bed in step II provides a constant pressure in the range of about 100–500 psig to effect adsorption of the gases on the adsorbent. This pressurization provided by $H_2$ and/or the feed requires a duration of about 6.5 minutes.

Upon completion of the pressurization step II, the co-current blowdown of step III is initiated to effect the sequential desorption of the adsorbed gases and is achieved by decreasing the partial pressure within the column (bed 2). Inasmuch as the $H_2$ is the least absorbable gas it is the first gas to be desorbed with this initial flow of hydrogen in the product gases being at a high purity in the order of about 99.7% with less than 0.001 sulfur compounds. The flow of the hydrogen continues until a suitable in-line detector determines that the hydrogen concentration or purity is at a level near the minimum purity desired. Normally, when the $H_2$ purity drops to about 95.00% the $H_2$ cut is terminated. With a further decrease in the partial pressure in the range of about 50 to 250 psig CO becomes desorbed and flows from the bed with $H_2$ which drops very rapidly in purity while the CO concentration increases to about 70 to 90%. With a further decrease in the partial pressure to about 25 to 120 psig the $CH_4$ is desorbed and continues to flow until the partial pressure drops to about 1 atmosphere. When the pressure of the bed reaches approximately 1 atmosphere which requires a duration of about 5.5 minutes step IV is initiated to effect the removal of the acid gases ($CO+H_2S$). This is achieved by evacuating the bed in step IV to a low pressure of about 0.001 to 0.5 atmospheres over a period of about 0.5 minutes. This evacuation is achieved with a countercurrent flow through the bed since the $CO_2$ and $H_2S$ which are the most readily adsorbed products of the gasification components and are adsorbed in the uppermost or initial portion of the column contacted by the gases. This countercurrent flow allows for the ready removal of these acid gas components. Once the evacuation is completed step I may then be again initiated without changing the adsorbent since the co-current blowdown and the evacuation (step IV) in effect regenerates the adsorbent in the beds.

Figure 2:
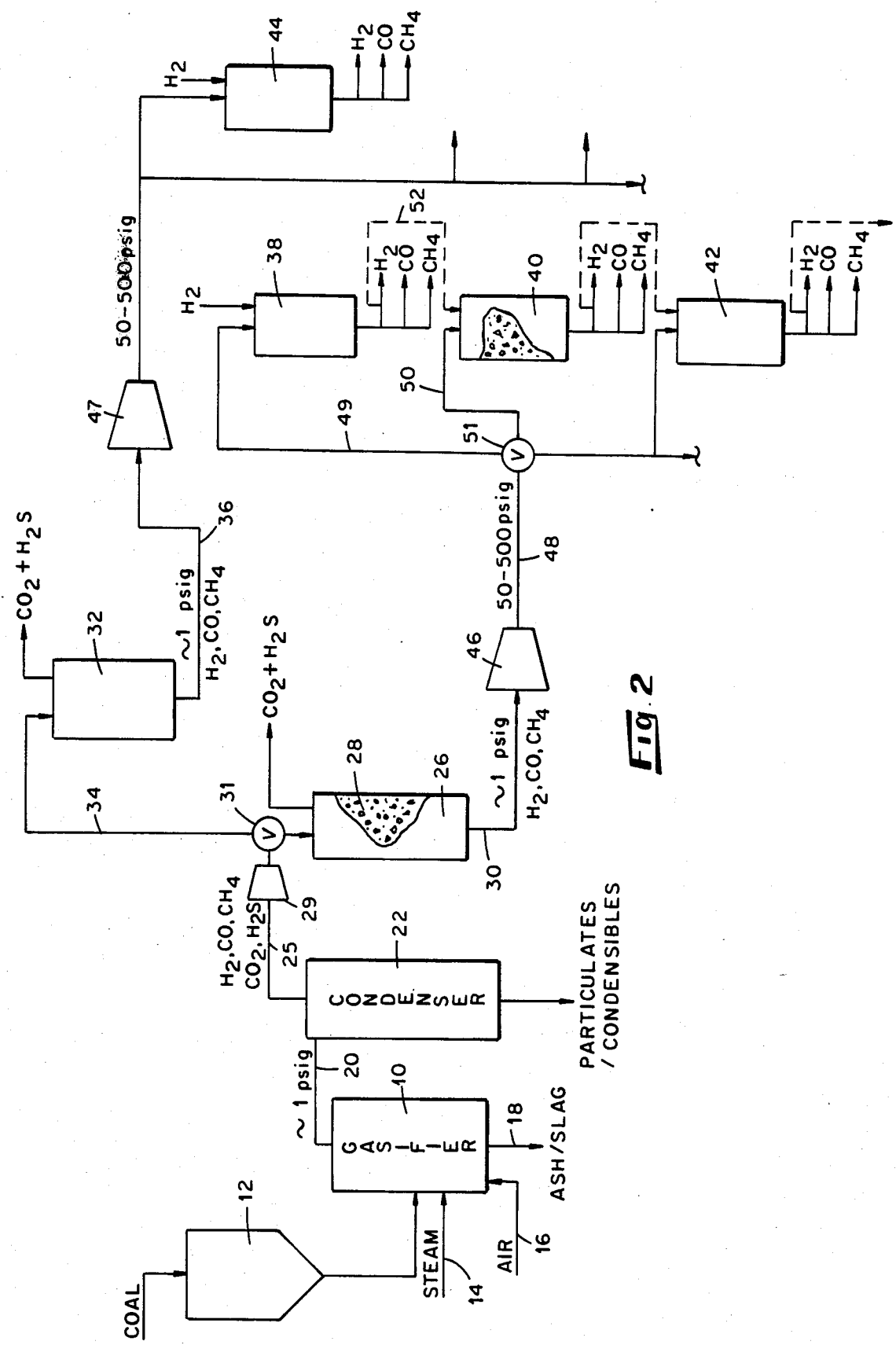
FIG. 2 is a schematic view showing a typical arrangement of a coal gasifier operating at or near atmospheric pressure with pressure swing adsorption columns disposed to effect the bulk separation of the product gases emanating from the gasifier.

FIG. 2 is directed to a coal gasification system operating at atmospheric pressure with the gaseous products of the gasification being divided among a plurality of columns each containing adsorbents. As shown, the gasifier 10 is provided with coal through a suitable hopper arrangement 12 while steam and air is introduced at 14 and 16 for supporting the gasification of the coal. The ash and slag resulting from the gasification is removed via conduit 18 while the gaseous components primarily made up of $H_2$, CO, $CH_4$, $CO_2$, and $H_2S$ are discharged through a conduit 20 into a condenser 22 or other suitable particle-gas-condensable separating apparatus where particulates and condensables such as ash and tar or the like are removed via coduit 24. The gases are then conveyed to a first pressure swing adsorption column 26 through conduit 25. This pressure swing adsorption column 26 and all the other columns are shown disposed in a vertical orientation with the gases being conveyed into the uppermost portion of the column but these columns can be positioned in other orientations if desired. The columns contain particulate activated carbon, particulate zeolites, or combinations thereof as the adsorbent as generally shown at 28. The particulate activated carbon is of a particle size of about 0.01 to 0.3 cm, a bulk density of about 0.6 to 1.0 gram/$cm^3$, and provides a total void fraction within the column of about 0.7 to 0.8. The zeolites are of a particle size of about 0.01 to 0.3 cm, a bulk density of about 0.1 to 1.2 gram/$cm^3$ and provide a total void fraction of about 0.6 to 0.7. These particulates of activated carbon, zeolites or combinations thereof selectively adsorb the gases as they enter the column due to the particular molecular structure of the gases with the $CO_2$ and $H_2S$ being adsorbed most readily with this adsorption initially occurring in the uppermost portion of the column. As the gases proceed through the column 26 which in this instance is maintained at about atmospheric pressure only the acid gases, $CO+H_2S$, are absorbed to any great extent. If required, additional pressurization of the gas charge in the column can be provided by compressor 29 in conduit 25. The remaining $H_2$, CO and $CH_4$ gases, flow through the adsorbent bed and are discharged from the lower end of the column through conduit 30 since the partial pressure in the adsorbent bed is insufficient to adsorb these gases. When column 26 is sufficiently saturated with CO and $H_2S$ the column 26 is cut off from the supply through suitable valving 31 in conduit 25 and the flow of gases from the condenser 22 is diverted into column 32 through conduit 34 for the purpose of scrubbing the acid gases from the gasification products. These gases passing through column 32 and the gases from column 26 are conveyed through a common conduit such as conduit 30 or separate conduits 30 and 36 into pressure swing adsorption columns 38, 40, 42 and 44 disposed in parallel. While two acid gas scrubbing columns 26 and 32 are shown it will appear clear that any number of columns can be utilized for providing this function. These gases are passed through a common compressor or a plurality of compressors 46 and 47, as shown, for increasing the pressure of the gases to over 50 psig which is the minimum pressure required for the adsorption by activated carbon. The pressurized flow of gases discharged from the compressor 46 pass through line 48 and are introduced initially into column 38 via line 49. The gases flow into column 38 until the adsorbent bed is no more than about 50% covered with the adsorbates in order to assure high purity recovery as mentioned above. When column 38 is sufficiently charged with the adsorbates and column 38 is pressurized sufficiently to effect adsorption of the gases including $H_2$ the flow of pressurized gases to column 38 is terminated and directed to column 40 via line 50. This serial charging relationship exists between column 40 and 42 and so on since several more columns would in the parallel array be required for processing the gases from a commercial size gasifier. Also, as with the gases discharged from compressor 47 and conveyed into column 44 several other columns are disposed for serially receiving the gas charges. A suitable valve 51 disposed at the juncture of conduits 48, 49 and 50 provide for charging the columns in a serial manner. Once the pressurization is completed in column 38 and each successive column the co-current blowdown of column is initiated to provide high purity cuts of $H_2$, CO and $CH_4$ as shown. The duration of each of these cuts is dependent upon the particular composition of the gases and the purity desired. Usually the purity desired of the hydrogen is in the range of about 95 to 99.999%, the carbon monoxide is in the range of about 70 to 95% and the methane is in the range of about 60 to 95%. When the co-current flow through each column is completed the column can again be charged with a fresh mixture of the gases from the compressor.

The apparatus as generally shown in FIG. 2 provides a satisfactory acid gas scrubber which effectively removes the acid gases from the gaseous products. When the adsorbent in each of the columns such as 26 and 32 functioning as acid gas scrubbers is adequately saturated with $CO_2$ and $H_2S$ it is taken off line and subjected to an evacuation step for effecting the desorption of the $CO_2$ and $H_2S$ as described above with reference to FIG. 1. Also, if desired the carbon monoxide and the $CH_4$ mixture may be utilized as a mixture for providing fuel gas useable in a suitable combustion system or as pipeline gas. As generally shown in FIG. 2, if desired, the high pressure $H_2$ discharging from column 38 may be utilized for facilitating the pressurization of the gases in column 40 via line 52 and likewise throughout the series of columns where the $H_2$ derived from a desorption step may be utilized to facilitate the pressurization of a subsequently charged column to and thereby reduce the energy requirements of the overall system.

Figure 3:
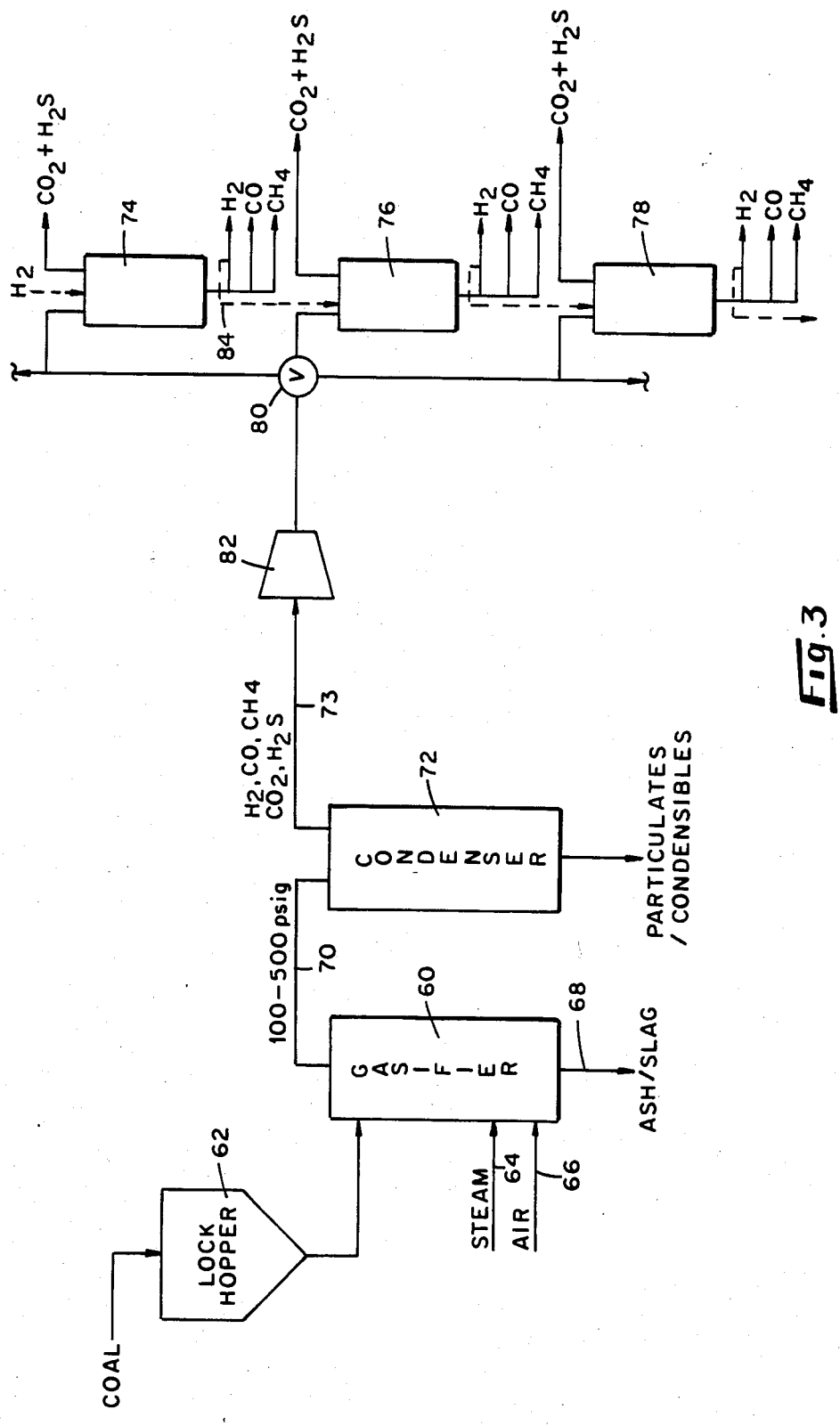
FIG. 3 is a schematic view illustrating a pressurized gasifier used in conjunction with pressure swing adsorption columns for effecting the bulk separation of the gasification products.

Another embodiment of the combined coal gasifier and pressure swing adsorption arrangement utilized for purification of the gases components resulting from the gasification of coal is shown in FIG. 3. In this embodiment the gasifier is a pressurized gasifier of a fixed or fluidized bed type operating at a pressure in the range of about 100-500 psig but can be a gasifier operating at a pressure in the range of about 1 to 1,000 psig. As shown, the gasifier 60 is charged with coal from a suitable lock hopper or the like 62 while steam and air at high pressure are introduced via lines 64 and 66, respectively. Ash and slag are withdrawn from the gasifier through line 68 while the other products of the gasification are withdrawn from the gasifier via line 70 and introduced into the condenser 72 for the selective removal of condensables and particulates. The charge of gases formed primarily of $H_2$, CO, $CH_4$, $CO_2$ and $H_2S$ discharged from the condenser 72 through line 73 is at a pressure in the range of about 95 to 495 psig due to the pressure drop across the condenser. These gases in line 70 are introduced into a plurality of parallel disposed-serially arranged pressure absorption columns generally shown at 74, 76 and 78. These columns each contain an adsorbent bed as in the columns of FIG. 2. If the pressure of the gases in line 73 discharging from the condenser 72 is at a pressure adequate to effect the adsorption of the $H_2$ an optional compressor, as generally shown at 82, need not be put into operation. This arrangement provides for a highly cost-efficient system for the separation of the gases since high energy users such as the compressor 82 may not be required or required only minimally for the pressurization of the gas charge necessary to effect the adsorption of the gas components. With the gases introduced into column 74 being at a feed pressure sufficient to effect the adsorption of the gaseous components including $H_2$, the adsorption of gases on the adsorbent in this column 74 will normally take approximately 6.5 minutes. The charging of this column is then terminated and the feed is diverted to column 76 and then to column 78 and so forth as with the serial arrangement in the FIG. 2 embodiment and provided by a suitable valve 80 operating as valve 51 as in the FIG. 2 embodiment. The co-current blowdown of each column is serially initiated with the $H_2$, CO and $CH_4$ being sequentially removed and cut until a pressure of about 1 atmosphere is present in the column. The column is then subjected to a suitable mechanical pump (not shown) for evacuating it down to a subatmospheric pressure of about 0.001 to 0.5 atmosphere for the purpose of removing the acid gases CO and $H_2S$. Like in the FIG. 2 embodiment the columns are disposed in parallel and sequentially charged and discharged so that the feed may be continuous from the gasifier. Also, the high pressure $H_2$ discharging from a column being reduced in partial pressure may be utilized as an additional pressurizing medium for successively disposed columns in the system such as between columns 74 and 76 via conduit 84.

If desired the pressure swing adsorption columns of the present invention may be utilized primarily for the production of high purity hydrogen in a manner not previously obtainable with coal gasification systems. To achieve this objective the partial pressure within each column is maintained at a level greater than that required for the adsorption of the next most absorbable gas in the mixture of gas in the mixture of gases available in the products of gasification and less than that required for the adsorption of the $H_2$. By providing such an arrangement the charge of gases introduced into the column except for the $H_2$ are adsorbed on the adsorbent while the $H_2$ flows through the column co-currently with the feed so as to provide a discharge of essentially pure hydrogen at the end of column opposite the feed. This operation may continue until the adsorbent is covered to an extent greater than about 80% which is greater than the maximum of about 50% required of the system if other gases of high purity are desired.

In order to provide a more facile understanding of the present invention an example relating to the pressure swing adsorption method and apparatus of the present invention is set forth below. In this example a gas mixture was prepared with 1% by volume of $H_2S$ and 24.75% each of $H_2$, CO, $CH_4$ and $CO_2$. A single adsorbent-containing column was utilized for simulating the steps of a multi-component pressure swing adsorption process. The column had a bed length of 67 meters with an inside radius of 2.05 cms. The adsorbent was activated carbon particles of a size of about 0.028 cm, a bulk density of 0.498 grams/cu. cm with a particle density of 0.85 grams/cu. cm was provided. An interparticle void fraction of 0.43 while an intraparticle void fraction of 0.61 were present to provide a total void fraction of 0.78.

EXAMPLE

A column containing the activated carbon as described above was charged at one end thereof with the gas mixture and pressurized with hydrogen for about 0.5 minute and then the $H_2$ flow was maintained for a period of 6.5 minutes to effect the adsorption of the gases on the adsorbent. Upon completion of this pressurization step which corresponds to step II of FIG. 1 co-current blowdown was initiated as in step III of FIG. 1 and continued for a period of 9.5 minutes. Then the column was subjected to countercurrent evacuation (step IV) to a subatmospheric pressure of 0.14 psig for over a period of 3 minutes. An overall time cycle of 19.5 minutes was used and would be typical of that provided in a gasification system such as shown in FIGS. 2 and 3. The evacuation step was performed by a mechanical pump and the bed was at an ambient temperature of 20° C. Several runs were repeated at various total pressures.

As shown in Tables 1 and 2 below, the feed pressure in runs 1 and 2 was at 21.4 atmospheres (300 psig)

whereas in runs 3 and 4 a feed pressure of 35 atmospheres was utilized. The co-current drawdown pressure at the end of step IIIc in run 1 was 1.1 atmosphere, in run 2 was 0.6 atmosphere, in run 3 was 1.1 atmosphere, and in run 4 was 0.8 atmosphere. As shown in Table 1, runs 1 and 2, the initiation of the blowdown or co-current reduction of the partial pressure within the column provided H₂ during step IIIa. This removal of the H₂ continued through step IIIa until the partial pressure was approximately 150 psig and then the hydrogen cut was terminated. The flow of CO was initiated in step IIIb with the pressure in the column at approximately 150 psig. As shown in Table I, the CO had a concentration of about 86.3% and 85.27% purity with the CH₄ concentration in the mixture being less than 3% and 1% and CO₂ less than 3%. At the end of step IIIb when the concentration of CO reduced to about 50% purity at a partial pressure in the column of about 4.0 atmospheres the CO cut was terminated and the CH₄ flow initiated (step IIIc). Blowdown during step IIIc provided a CH₄ purity in the range of about 56% and 55% with about 22% CO and about 20.62% and 31.41% CO₂. In run 1 through step IIIc there was no evidence of any sulfur components in the blowdown gases. The mechanical pumpdown was then initiated in step IV to provide for the recovery of the carbon dioxide and the hydrogen sulfide. As shown in Table I at the percentage of the gases recovered in run 1 from the mixture indicated that 90.4% of the hydrogen was recovered, 98.7% of the CO was recovered, 83.9% of the CH₄ was recovered, 69.39% of the CO₂ was recovered, and 100% of the H₂S was recovered. In run 2 of Table I where the pressure at the end of step IIIc was 0.6 atmosphere the purity of the gases recovered was essentially the same as in run 1 during the steps IIIa, IIIb and IIIc except that about 0.001% of H₂S was present occurred during step IIIc due to the pressure drop below about 1 atmosphere in step IIIc.

As shown in Table 2, runs 3 and 4 compared quite similarly to runs 1 and 2 and provided a clear distinction of the several cuts of high purity gases obtained during co-current drawdown and the countercurrent evacuation of the column. As shown in run 4, the level of H₂S removed was slightly greater with the partial pressure at 0.8 atmosphere at the end of step IIIc than that provided with a higher partial pressure of 1.1 atmosphere at the end of step IIIc in run 3.

TABLE I

| Step | Run 1 Composition, % | | | | | Run 2 Composition, % | | | | |
|---|---|---|---|---|---|---|---|---|---|---|
| | H₂ | CO | CH₄ | CO₂ | H₂S | H₂ | CO | CH₄ | CO₂ | H₂S |
| II | 100.00 | | | | | 100.00 | | | | |
| IIIa | 99.98 | 0.02 | 0.00 | | | 99.84 | 0.10 | 0.06 | | |
| IIIb | 7.91 | 86.30 | 2.96 | 2.82 | | 11.18 | 85.27 | 0.78 | 2.77 | |
| IIIC | 1.73 | 22.35 | 55.30 | 20.62 | | 2.18 | 14.44 | 51.97 | 31.41 | 0.001 |
| IV | 0.99 | 1.32 | 16.52 | 76.65 | | 1.30 | 2.23 | 10.58 | 79.59 | 6.30 |
| Recovery, % | 90.40 | 98.74 | 83.90 | 69.39 | 100.00 | 84.80 | 98.83 | 93.97 | 43.36 | 99.46 |

TABLE II

| Step | Run 3 Composition, % | | | | | Run 4 Composition, % | | | | |
|---|---|---|---|---|---|---|---|---|---|---|
| | H₂ | CO | CH₄ | CO₂ | H₂S | H₂ | CO | CH₄ | CO₂ | H₂S |
| II | 100.00 | | | | | 100.00 | | | | |
| IIIa | 98.03 | 1.97 | | | | 98.15 | 1.84 | 0.01 | | |
| IIIb | 5.34 | 75.27 | 15.45 | 3.94 | | 4.79 | 71.64 | 18.39 | 5.17 | |
| IIIC | 1.37 | 17.83 | 56.70 | 24.10 | | 1.39 | 16.81 | 53.96 | 27.84 | |
| IV | 0.69 | 1.37 | 13.42 | 80.12 | 4.41 | 0.96 | 1.08 | 9.88 | 82.65 | 5.42 |
| Recovery, % | 92.71 | 97.15 | 89.03 | 65.08 | 100.00 | 92.56 | 97.52 | 93.39 | 55.55 | 100.00 |

It will be seen that the present invention provides an approach to the separation of the products of gasification into discrete high purity streams of gas. More particularly the present invention is uniquely suitable for providing high purity hydrogen and an acid gas scrubbing technique by pressure swing adsorption so as to overcome a significant problem in the coal gasification art heretofore encountered with respect to providing a viable high purity hydrogen production technique.

We claim:

1. The method for bulk separation of multi-component gases generated in a coal gasification process wherein coal is gasified in a gasifier to produce gasification products including a mixture of gases comprising hydrogen, carbon monoxide, methane, and acid gas components carbon dioxide and hydrogen sulfide, comprising the steps of conveying a stream comprising the mixture of gases into one end of an elongated column containing a solid adsorbent for each of said gases forming the mixture of gases, pressurizing the charge of gases within said column to a pressure within a range sufficient to effect the adsorption by the adsorbent of the conveyed gases including said hydrogen defining the least absorbable gas in said mixture of gases, decreasing the partial pressure of the charge of gases in said column to effect the sequential desorption of the gases hydrogen, carbon monoxide, and methane from the adsorbent in said column, and conveying the adsorbed gases from said column upon desorption thereof from said adsorbent.

2. The method as claimed in claim 1 wherein the adsorbent is a porous bed formed of particulate activated carbon, zeolites, or combinations thereof, and including the further step terminating the flow of the stream of said mixture of gases into said one end of said column when a maximum of about fifty percent of said bed is covered with adsorbed gases.

3. The method claimed in claim 1, including the additional step of reducing the partial pressure in said column to a pressure less than atmospheric pressure to effect the desorption of carbon dioxide and hydrogen sulfide from said column upon the desorption thereof.

4. The method claimed in claim 3 wherein the step of conveying the gases from said column upon the desorption thereof is a stream co-current with said stream from an end of said column opposite the first-mentioned end, and wherein the step of conveying the acid gas components from said column is a flow countercurrent to said stream from the first-mentioned end of said column.

5. The method claimed in claim 4, including the step of placing a plurality of said columns in a parallel array, and conveying the first-mentioned stream of the mixture of gases to each of said plurality of columns in serial manner.

6. The method claimed in claim 5, wherein said gasifier gasifies the coal at a pressure in the range of about 50 to 1,000 psig for at least substantially providing the step of pressurizing said charge of gases to said pressure within said range.

7. The method claimed in claim 6 including the additional step of removing condensable and particulate material from said stream prior to the conveyance thereof into each of said columns.

8. The method claimed in claim 1 including the additional step of conveying a stream of the mixture of gases into another column containing a solid adsorbent for at least the acid gas components with said another column being positioned intermediate said gasifier and the first-mentioned column for receiving the mixture of gases therein from said gasifier, providing the mixture of gases in said another column with a partial pressure adequate to adsorb only the acid gas components in the mixture of gases, and conveying the non-adsorbed gases from said another column into the first-mentioned column.

9. The method of claim 8 including the further steps of conveying the hydrogen, carbon monoxide, and methane from said another column into a further column containing a solid adsorbent for hydrogen, carbon monoxide, and methane, sufficiently pressurizing the gases within the further column to effect the adsorption of the gases, including hydrogen, decreasing the partial pressure in said further column to effect the sequential desorption of the hydrogen, carbon monoxide, and the methane, and sequentially removing the desorbed gases from said further column to provide discrete streams consisting essentially of each gas.

10. The method claimed in claim 5 including the step of placing a plurality of said further columns in a parallel array, and conveying a stream of the hydrogen, carbon monoxide, and methane into one end of each of said further columns from said another column in a serial manner.

11. The method claimed in claim 10 wherein the step of conveying the gases from each of said further columns upon the desorption thereof is a stream flowing co-current with the stream entering said one end of each of said further columns and from an end of said further column opposite said one end of each of said further columns.

12. The method claimed in claim 10 wherein the step of sufficiently pressurizing the gases in said further columns comprises compressing the gases prior to being conveyed into said one end of each of said further columns to a pressure in the range of 50 to 1,000 psig.

13. The method claimed in claim 8 wherein said gasifier gasifies the coal at substantially atmospheric pressure, and including a further step of removing condensable material and particulates from said mixture of gases prior to conveying said mixture of gases into said another column.

* * * * *